Jan. 13, 1931.  H. C. HARRISON  1,788,487
VIBRATION TRANSMISSION SYSTEM
Filed Feb. 2, 1927   4 Sheets-Sheet 1

Inventor:
Henry C. Harrison
by *[signature]*
Attorney

Jan. 13, 1931.  H. C. HARRISON  1,788,487
VIBRATION TRANSMISSION SYSTEM
Filed Feb. 2, 1927  4 Sheets-Sheet 2
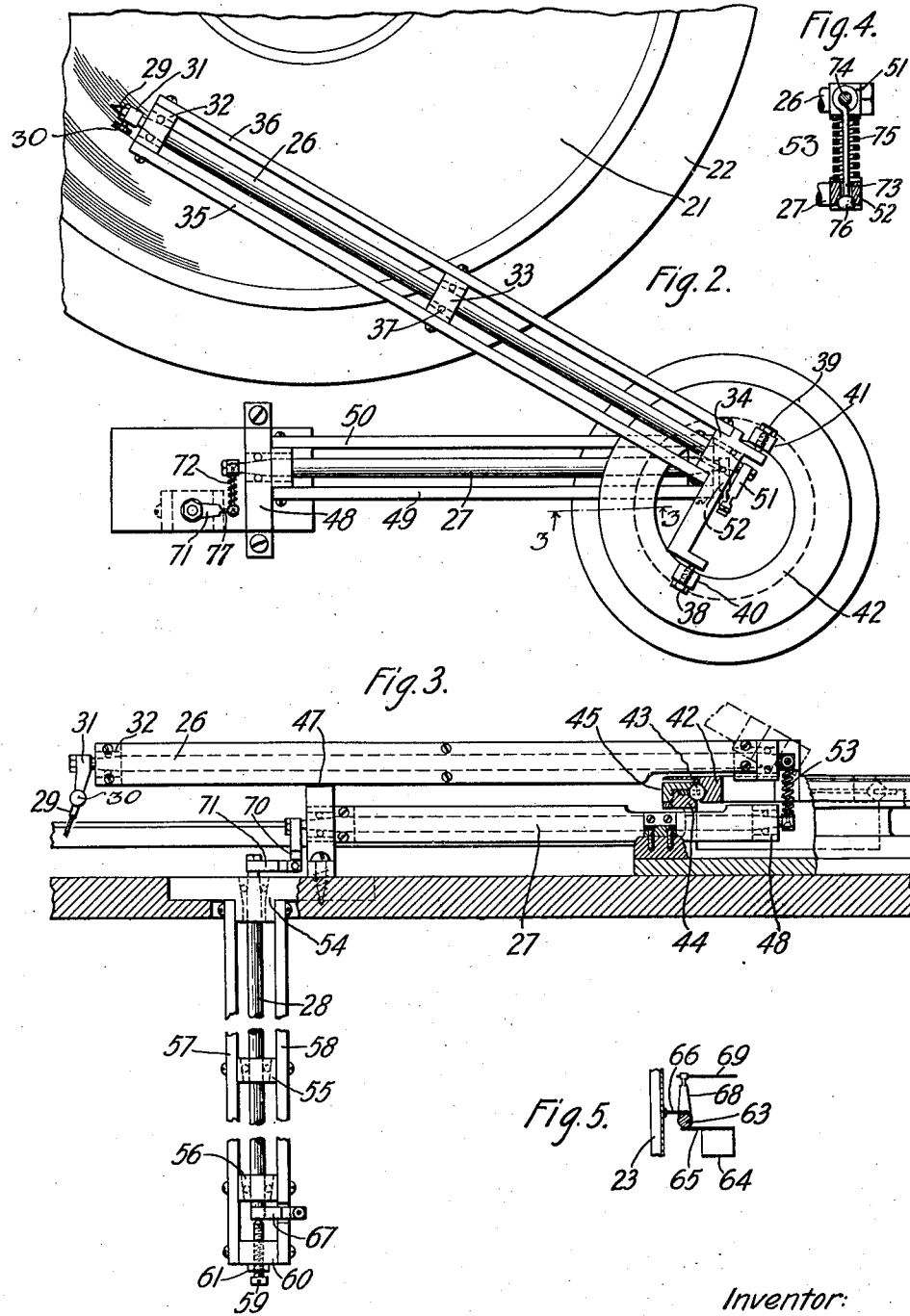
Inventor:
Henry C. Harrison
by Joel C. P. Soemes
Attorney.

Jan. 13, 1931.  H. C. HARRISON  1,788,487
VIBRATION TRANSMISSION SYSTEM
Filed Feb. 2, 1927  4 Sheets-Sheet 3
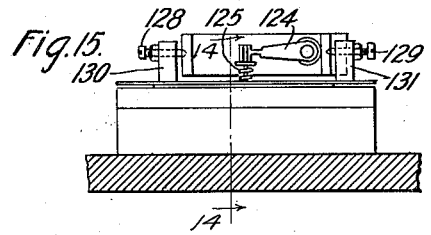
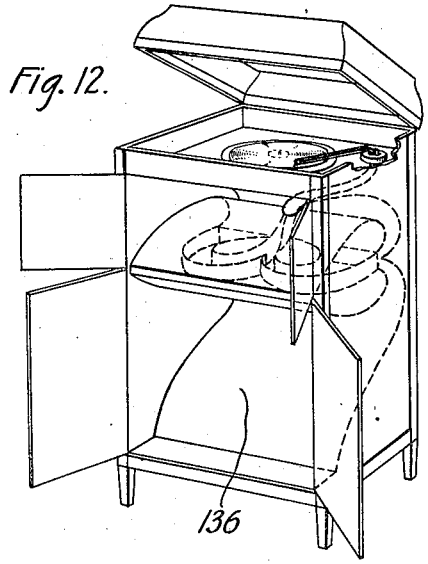
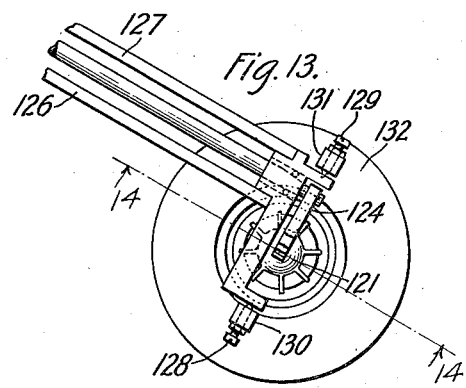
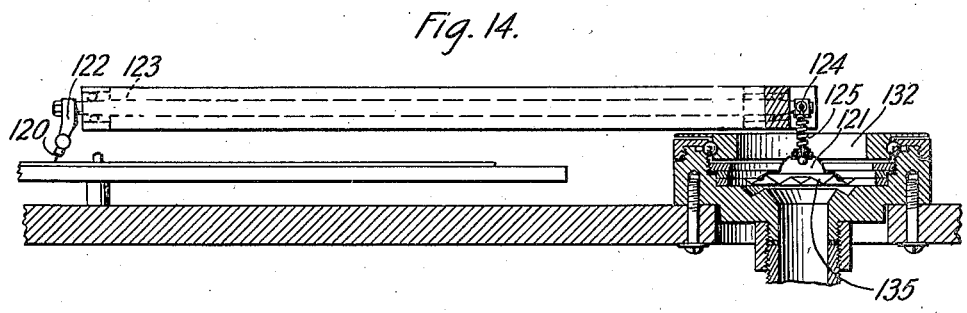
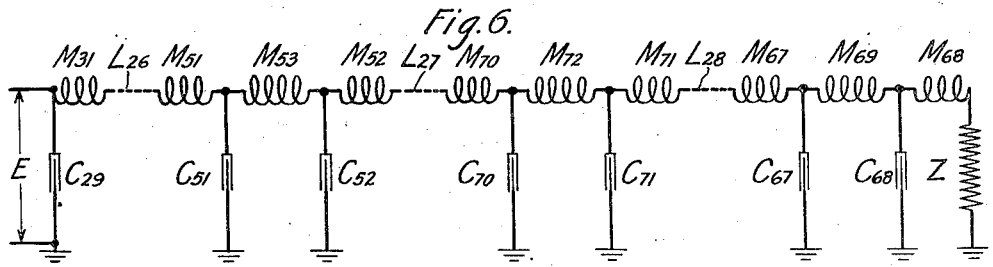
Inventor:
Henry C. Harrison
by Jul CR. Palmer
Attorney.

Jan. 13, 1931.    H. C. HARRISON    1,788,487
VIBRATION TRANSMISSION SYSTEM
Filed Feb. 2, 1927    4 Sheets-Sheet 4
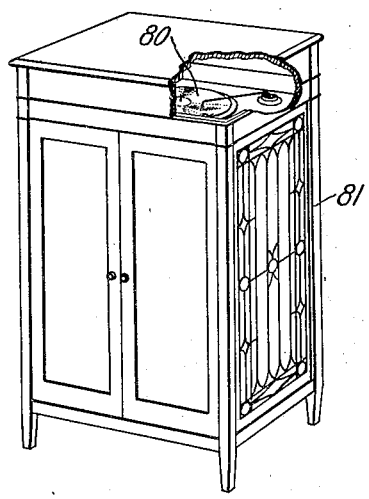
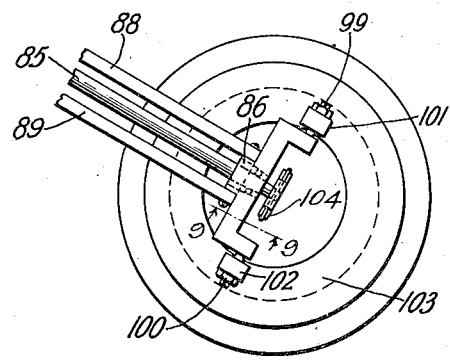
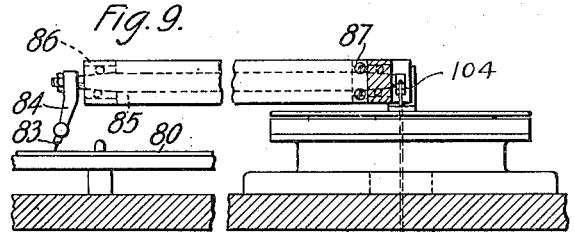
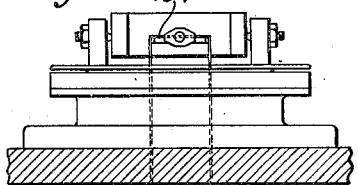
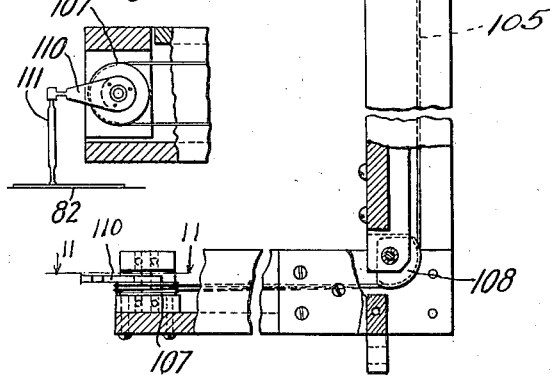
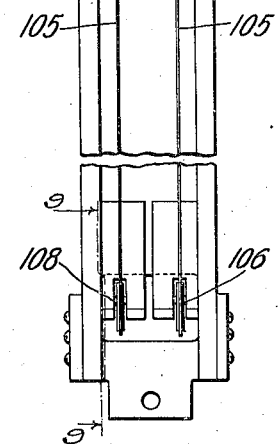
Inventor:
Henry C. Harrison
by *(signature)*
Attorney Patented Jan. 13, 1931

1,788,487

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

VIBRATION TRANSMISSION SYSTEM

Application filed February 2, 1927. Serial No. 165,286.

This invention relates to mechanical vibration transmission systems and particularly to a system for receiving vibrations from a phonograph record and transmitting them to the diaphragm of a sound radiator.

The primary object of the invention is to mechanically transmit vibrations without appreciable distortion and with high efficiency over a wide frequency range.

To attain this object the invention contemplates a vibration transmission system comprising a plurality of long members, rotatable about their longitudinal axes, and a coupling means therefor. The iterative impedance of each rotatable member is preferably substantially matched to the initial iterative impedance of the coupling member connected thereto. The elements of the coupling members are so constructed as to constitute mechanical wave filter sections of the low pass type.

In a specific embodiment herein shown and described the mechanical vibration transmission system is employed in a phonograph for transmitting vibrations from the needle to a direct-acting diaphragm located in the phonograph cabinet and driven at a location remote from the phonograph needle. A plurality of long vibration transmitting members extending in different directions are employed, for transmitting vibrations from the needle to the diaphragm and a universal joint is provided between the member to which the needle is coupled and the adjacent member so as to permit the vertical or horizontal movement of the transmitting member to which the needle is attached without transmitting such movements to the diaphragm. The vibration transmitting members are rotatable about their longitudinal axes and have their adjacent ends coupled by means of crank members secured thereto and connected by means of a rod pivotally connected to the crank members. Each crank member has a portion of reduced cross-section acting as a yielding portion i. e. as a compliance, whereas the remainder of the crank member is made of such rigidity as to move as a unit making it from the impedance viewpoint a simple concentrated, or lumped, mass.

The invention may be better understood by referring to the following detailed description and the acompanying drawing in which:

Fig. 2 is a top view on an enlarged scale of the vibration transmission system shown schematically in Fig. 1;

Fig. 3 is a side view, partly in section, of this vibration transmission system and shows the needle arm swung out of playing position;

Fig. 4 is a detailed view of a link used for connecting crank members which form a part of the vibration transmission system;

Fig. 5 is a detailed view showing the coupling between the transmission system and the direct acting diaphragm employed in the phonograph shown in Fig. 1;

Figure 1:
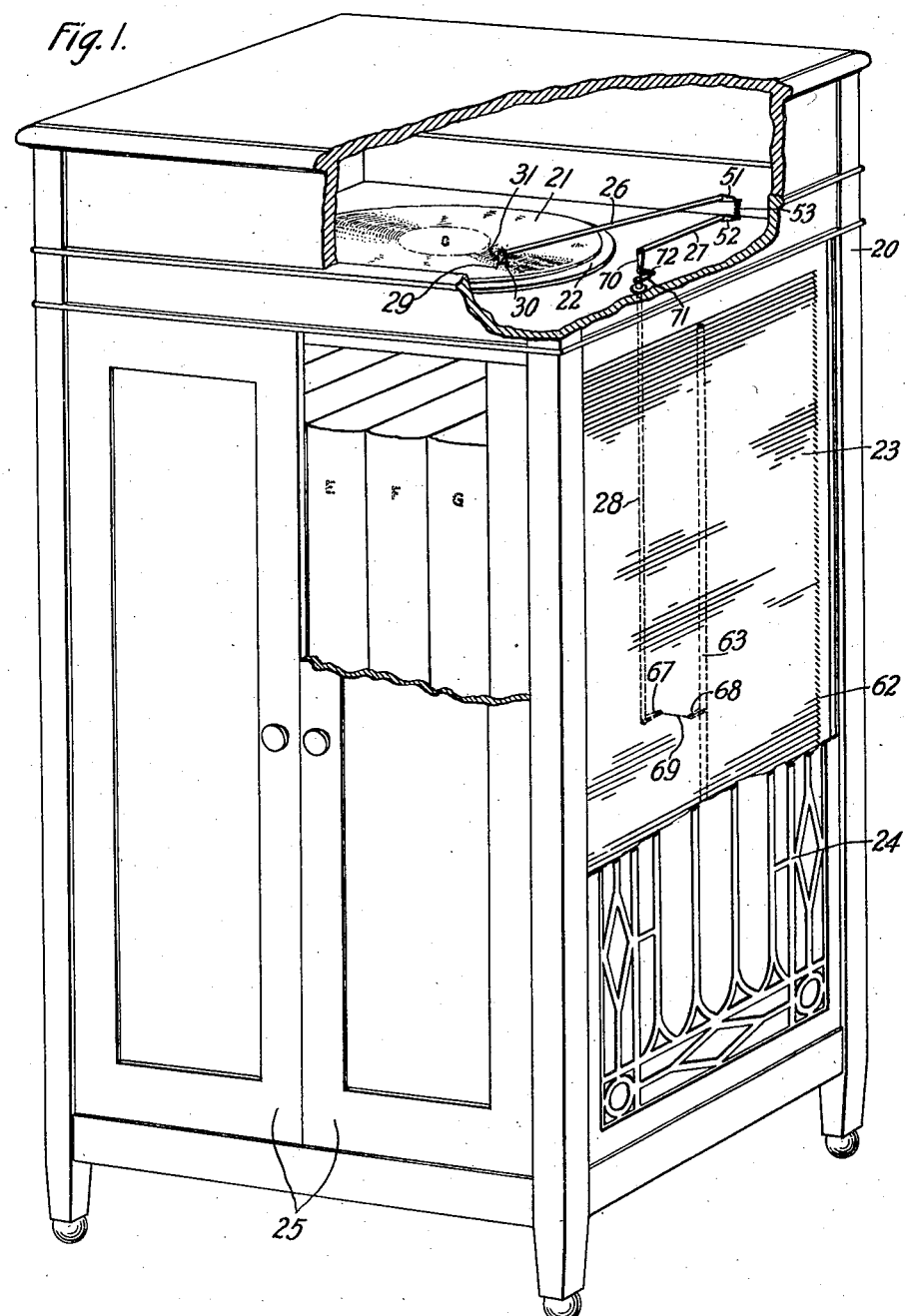
Fig. 1 is a perspective view of a phonograph employing a vibration transmission system in accordance with the present invention, a part of the phonograph cabinet being broken away in order to show schematically the construction of the transmission system.

Fig. 6 is a mechanical impedance diagram of the vibration transmission system of this invention and is analogous to impedance diagrams familiarly used for electrical circuits. It is introduced here for the purpose of showing from an impedance viewpoint, the arrangement of the series mass elements and the shunt compliance elements of the mechanical wave filter construction of the mechanical system shown in Figs. 1 to 5 inclusive.

Fig. 7 is a perspective view of a phonograph employing a vibration transmission system which is a modification of the system shown in Figs. 1 to 5 inclusive.

Fig. 8 is a top view of a portion of the vibration transmission system employed in the phonograph shown in Fig. 7;

Fig. 9 is a side view, partly in section, of the vibration transmission system employed in the phonograph shown in Fig. 7;

Fig. 10 is a rear end view of the vibration transmission system shown in Fig. 9;

Fig. 11 shows a means for coupling a diaphragm to the vibration transmission system shown in Fig. 9;

Fig. 12 is a perspective view of a phonograph employing another modification of the vibration transmission system shown schematically in Fig. 1;

Fig. 13 is a top view of a part of the vibration transmission system employed in the phonograph shown in Fig. 12;

Fig. 14 is a side view, partly in section, of the vibration transmission system employed in the phonograph shown in Fig. 12; and Fig. 15 is a view, partly in section, taken along line 15—15 of Fig. 14.

Referring now particularly to Figs. 1 to 4, inclusive, the mechanical vibration transmission system is shown assembled in a phonograph cabinet 20 so that vibratory energy may be transmitted from a record 21, positioned on a turn table 22, to the direct acting diaphragm 23. The diaphragm is shown mounted in a rectangular opening in the front of the cabinet but may be mounted in other locations if desired. For example in a console cabinet it may be found desirable to mount the diaphragm in the bottom of the cabinet. The screen 24, mounted in this opening in front of the diaphragm 23, serves to protect the diaphragm. The space in back of the diaphragm is made accessible by means of the doors 25 and may be employed for storing records, for containing radio equipment or for other useful purposes.

The vibration transmission system comprises the longitudinally rotatable members 26, 27 and 28 and suitable coupling members for connecting them. The needle 29, which is adapted to be set into vibration in accordance with the sound recorded on record 21 as it moves along the groove therein, is secured by the set screw 30 to the needle arm 31, the needle arm in turn being rigidly secured to the end of the rod or longitudinally rotatable member 26. This rod is supported by the bearing members 32, 33 and 34 which are secured to the supporting members 35 and 36 and in which magnetic ball bearings 37 are preferably employed. The ends of supporting members 35 and 36 are pivoted on the screws 38 and 39, thus permitting the needle to be raised from the record in a vertical plane, as viewed in Fig. 1. The screws 38 and 39 pass through threaded openings in lugs 40 and 41 of annular member 42 which is mounted on ball bearings 43. These bearings fit in a race formed by the annular member 42, the base member 44 and a clamping ring 45 which engages a threaded portion of the base member 44, this base member being secured to a support 46. The rod 27 is coupled to the rod 26 by means of crank members 51 and 52 which are rigidly secured to the rods 26 and 27, respectively, and joined by the connecting member 53. The rod 28 extends perpendicular to rod 27 and is supported by magnetic ball bearing members 54, 55 and 56, secured to supporting members 57 and 58 which in turn are secured to the support 46. The rod 28 is additionally supported by the point bearing portion of screw 59 threaded into a member 60 of the supporting structure where it is secured by means of a lock nut 61. The rod 28 is coupled to the rod 27 by means of crank members 70 and 71 which are rigidly secured to rods 27 and 28, respectively, and joined by the connecting member 72.

While various types of diaphragms may be employed, the diaphragm 23 as shown is made of paper having corrugations formed therein which extend in the direction of its width and is rigidly secured at its perimeter to the frame 62. It may be actuated by any suitable means but preferably by a rotatable line drive such as is claimed and disclosed in Patent 1,726,105, August 27, 1929. This latter driving means which is shown in Figs. 1 and 5, comprises a metallic rod 63 which extends parallel to the diaphragm in the direction of its length and is connected to a support 64 by means of strip 65 of paper or other light material, one edge of which is cemented or otherwise secured to the rod 63 along an element of tangency, the other edge being similarly secured to the support 64 which extends the full length of the diaphragm and is rigidly secured in any convenient manner to the phonograph cabinet or the diaphragm support. One edge of a similar strip 66 is secured to the rod along a diametrically opposite element of tangency and the opposite edge of the strip is preferably serrated to fit into the corrugations of the diaphragm to which it is secured. Crank members 67 and 68, similar to crank members 51, 52, 70 and 71, are secured to the rod 28 and the rod 63, respectively, and connected by means of a rod 69.

Fig. 4 is a detailed view of the connecting member 53. The rod 73 is provided at one end with a hinged portion 74 which is attached near an end of crank member 51. The other end of rod 73 is provided with a ball portion 76 which fits into a socket in the crank member 52. The helical compression spring 75 is positioned about the rod 73 and impinges against the crank members 51 and 52 so as to maintain a firm contact between them on the rod 73. It should be noted that the center of the hinged member 74 is on an axis extending between the screws 38 and 39 and that the ball portion 76 is on an axis about which the annular member 42 rotates. It is thus apparent that the needle 29 may be moved in vertical or horizontal planes without imparting rotative motion to the rod 26. It should also be noted that all of the crank members have a yieldable portion formed therein as best illustrated in Fig. 2 which shows the flexible portion 77 of crank member 71.

A mechanical impedance diagram showing the arrangement of the parts of the system from a mechanical wave transmission viewpoint in a way analogous to electrical impedance diagrams of electrical transmission systems is shown in Fig. 6. It has been recognized that corresponding quantities in mechanical and electrical systems are:

| Force | Electromotive force |
| Displacement | Charge |
| Velocity of vibration | Current |
| Mass | Inductance |
| Compliance or reciprocal of stiffness | Capacity |
| Mechanical resistance or friction | Resistance |

In Fig. 6 the same symbols are used for mass and compliance as are commonly used in electrical impedance diagrams for inductance and capacity, since the quantities are corresponding ones as respects energy storage and hence have corresponding effects on the transmission of energy. In this diagram the terms "mass" and "compliance" are used to denote respectively the kinetic and the potential energy storing properties of the parts with respect to their linear velocities and displacements. Where, in the physical structure, the motion is angular, the masses and elasticities are taken as those of the equivalent linear system. The subscript numerals employed with the mass designations M and the compliance designations C are the same as employed to designate the various parts of the vibration transmission system in the preceding figures.

In tracing the impedance diagram from its input or needle end to its output or diaphragm, the following observations may be made: The compliance of the needle point $C_{29}$ is in shunt with the mechanical line to which the driving force E is applied, and the needle arm mass $M_{31}$ is in series with the line. This portion of the system is in the form of a low pass filter section of the L type and it has been found preferable to make the compliance $C_{29}$ about 0.8 of the value of the compliances employed in the T type filter sections used in another portion of the system to be described below. The mass $M_{31}$ is in series with the line $L_{26}$ which represents the transmission characteristics of the rod 26. This is a relatively long transmission path, i. e., one which is so long that it can not be regarded as a lumped mass or elasticity and must be regarded as a line having distributed constants. Since the dissipation in such a line is negligible, all frequencies are transmitted with substantially equal efficiency and the velocity of the transmitted waves is the same for all frequencies and approximately equal to the reciprocal of the square root of the product of its mass and compliance, that is, $$V = \frac{1}{\sqrt{M_{26} C_{26}}}$$

where V is velocity, $M_{26}$ is the mass per unit length and $C_{26}$ the compliance of torsion per unit length of the rod 26. Neglecting mechanical resistance, the iterative impedance of the line is equal to $$\sqrt{\frac{M_{26}}{C_{26}}}.$$

The line $L_{26}$ connects to the coupling member formed by the crank members 51 and 52 and the connecting member 53. The mass and compliance of crank member 51 are represented, respectively, by $M_{51}$ and $C_{51}$; the mass of the connecting member 53 by $M_{53}$, this rod preferably having very low compliance; and the mass and compliance of crank member 52 are represented by $M_{52}$ and $C_{52}$, respectively. It will be observed that this portion of the transmission line is in the form of a low pass filter section of the T type, that is one having a mid-series termination and comprising the equal masses $M_{51}$ and $M_{52}$, the equal compliances $C_{51}$ and $C_{52}$ and the mass $M_{53}$ which is preferably twice as great as mass $M_{51}$ or $M_{52}$. The cut-off frequency $f_c$ of this portion of the circuit is equal to $$\frac{1}{\pi \sqrt{M_{53} C_{51}}}.$$

It is apparent that the filter elements $M_{53}$ and $C_{51}$ should have a low value for the product of mass and compliance in order that the cut-off frequency might be high. The initial iterative impedance of this filter section is equal to $$\sqrt{\frac{M_{53}}{C_{51}}}.$$

This portion of the system connects to the line $L_{27}$ having similar transmission characteristics to those of the line $L_{26}$ discussed above. This line connects to a second coupling portion having transmission characteristics of a low pass filter of the T type. This portion of the system comprises the masses $M_{70}$, $M_{71}$ and $M_{72}$ and the compliances $C_{70}$ and $C_{71}$, the values of these elements being equal to corresponding elements of the preceding filter section. A third line represented by $L_{28}$ is the next portion of the system and is followed by a third section of the low pass filter type discussed above. This filter section is composed of the masses $M_{67}$, $M_{68}$ and $M_{69}$ and the compliances $C_{67}$ and $C_{68}$. This third filter section connects to the diaphragm impedance Z.

As has been pointed out above, the filter section should preferably be designed to have a high cut-off frequency in order that the entire band of frequencies which are essential for faithful reproduction of speech and music may be transmitted. Moreover, in order to avoid reflection of transmitted vibrations, the iterative impedance of the members 26, 27 and 28 represented by the substantially distortionless lines $L_{26}$, $L_{27}$ and $L_{28}$ respectively and the impedance Z of the diaphragm (including the metallic rod 63 and the strips 65 and 66) should be approximately equal to the initial iterative impedance of the low pass filter sections. It may, however, be found preferable to make the iterative impedance of the lines $L_{26}$, $L_{27}$ and $L_{28}$ and the impedance Z slightly lower than the initial iterative impedance of the filter sections for the reason that the iterative impedance of low pass filter sections having a mid-series termination decreases with frequency up to its cut-off point. The principles and formulæ governing transmission systems such as the one shown in Fig. 6 are worked out for analogous electrical systems in books such as "The Propagation of Electric Currents in Telephone and Telegraph Conductors" by J. A. Fleming, "Artificial Lines" by A. E. Kennelly, and "Transmission Circuits for Telephone Communication" by K. S. Johnson. A detailed analysis of mechanical and electrical analogs is contained in an article entitled, "High Quality Recording and Reproducing of Music and Speech," published in the Journal of the A. I. E. E. for March, 1926, page 243.

A modification of the vibration transmission system illustrated in the preceding figures is shown in Figs. 7 to 10, inclusive. In this modification, both rotatable and tensional members are employed for transmitting the vibrations received from the record 80 to a direct acting diaphragm 82. The portion of this system extending from the needle to the tensional member is practically the same as the corresponding portion of the system shown in Figs. 1, 2 and 3 and it seems unnecessary, therefore, to describe this portion of the system in great detail. This part of the system comprises the needle 83 secured to the needle arm 84 which in turn is secured to the rotatable member 85. The rotatable member is supported by the magnetic ball bearing members 86 and 87 which are secured to the supporting members 88 and 89. The ends of the supporting members are pivoted on the screws 99 and 100 which pass through the lugs 101 and 102 of the annular rotatable member 103. The mid-portion of rod 104 is secured to the end of rod 85. One end of a tape, wire or other similar member 105 is secured to one end of the rod 104. This tape passes around the wheels 106, 107 and 108 and is terminated at the end of rod 104 opposite the end mentioned above. The arm 110 is secured to the wheel 107 and a rod 111 connects this arm to a diaphragm 82. In the operation of this embodiment of the invention, vibrational force applied at the needle causes the rod 85 to rotate, which movement in turn imparts angular motion to the rod 104. Tensional force is thus applied to the tape 105 at its ends, which results in the rotary motion of the wheel 107 and the vibration of the diaphragm 82. Neglecting resistance, the iterative impedance of the tensional member 105 equal $$2\sqrt{\frac{M}{C}}$$

where M and C are the mass and compliance per unit length, respectively.

In the embodiment of the invention shown in Figs. 12 to 15, inclusive, vibrational energy is transmitted from a needle 120 to a diaphragm 135 by means of a needle arm 122, a rod 123 and a coupling member comprising a crank 124 and a rod 125 which is pivotally connected to the crank member 124 and rigidly secured to the driving spider 121 which, in turn, is connected to the diaphragm 135. The supporting members 126 and 127 for the rod 123 are pivoted on the screws 128 and 129 which thread through lugs 130 and 131 of the rotatable member 132. The diaphragm 135 is secured at its periphery and is adapted to radiate sound into the throat of a folded horn 136.

While the transmission system of this invention has been shown in connection with a phonograph reproducing device, it is apparent that there are many other applications therefor as, for instance, a phonograph recording system.

What is claimed is:

1. A mechanical vibration transmission system comprising a plurality of long vibration transmitting paths rotatable about their longitudinal axes and having such values of mass and compliance that the transmission is substantially uniform over a wide range of frequencies, and means for connecting said paths in series, said means comprising elements having lumped mass and lumped compliance forming a low-pass wave filter.

2. A mechanical vibration transmission system comprising a plurality of long vibration transmitting paths rotatable about their longitudinal axes and connecting means therefor comprising elements having lumped mass and lumped compliance forming a low-pass wave filter, said paths and said connecting means having such values of mass and compliance that their iterative impedances are substantially equal.

3. A vibration transmission system, comprising a plurality of longitudinally rotatable members extending in different directions and means for connecting said members in series.

4. A vibration transmission system comprising a plurality of longitudinally rotatable members and means for coupling at least two of said members so that the angular displacement of the axis of one of said members with respect to the axis of another does not impart rotary motion to said members.

5. A vibration transmission system, comprising a plurality of longitudinally rotatable members, and means for coupling said members, at least of one of said members being movable in a plurality of planes about this coupling portion without imparting rotary motion to another of said members.

6. A vibration transmission system comprising a driving means, a driven means, a plurality of longitudinally rotatable members, extending in different directions for connecting said driving means with said driven means, and means for coupling said rotatable members in series.

7. A vibration transmission system, comprising a plurality of longitudinally rotatable members, and means for coupling said members, said coupling means comprising arms, one of which is secured to each of said rotatable members, yieldable means forming part of said arms, a connecting member pivotally connected to said arms, and yieldable means impinging upon said arms for maintaining a firm contact between said arms and said connecting member.

8. In a phonograph employing a sound record and a diaphragm for radiating sound, a vibration transmission system for transmitting the vibrations recorded in said record to said diaphragm, comprising an arm, a longitudinally rotatable member, bearing members secured to said arm, for supporting said longitudinally rotatable member, a needle secured near one end of said rotatable member for receiving the vibrations recorded in said record, a second longitudinally rotatable member, an arm having bearing members for supporting said second rotatable member, cranks connected to adjacent ends of said rotatable members, means for pivotally connecting said cranks, a third longitudinally rotatable member and supporting means therefor, cranks and a pivotal connecting member for coupling the adjacent ends of said second and third rotatable members, a crank at the opposite end of said third rotatable member and means for connecting said last mentioned crank to said diaphragm.

9. In a phonograph employing a sound record and a diaphragm for radiating sound, a vibration transmission system for transmitting the vibrations recorded on said record to said diaphragm, comprising an arm movable in a plurality of planes, a longitudinally rotatable member, magnetic ball bearing members secured to said arm for supporting said rotatable member, a needle secured to one end of said rotatable member for receiving the vibrations recorded on said record, a second longitudinally rotatable member, a stationary arm having magnetic ball bearing members for supporting said second rotatable member, said second mentioned arm extending in a substantially horizontal plane and in an angular direction with respect to said first mentioned arm, cranks having a yieldable portion connected to adjacent ends of said rotatable members, means for pivotally connecting said cranks, a spring impinging upon a portion of said cranks for securing a firm contact between the cranks and said connecting means, a third longitudinally rotatable member and supporting means therefor, extending angularly with respect to said second mentioned rotatable member, means comprising cranks, a pivotally connecting member, and a spring for coupling the adjacent ends of said second and third rotatable members, a crank at the opposite end of said third rotatable member and means for connecting said crank to said diaphragm.

10. In a mechanical vibration transmission system, a plurality of vibration transmitting members, a support for one of said members, a fulcrum for said support, means including a hinge portion for connecting two of said vibration transmitting members, the axis of said hinge portion being common with the axis of said fulcrum.

11. In a mechanical vibration transmission system, a plurality of vibration transmitting members, a support for one of said members, a rotatable member, a fulcrum for connecting said support to said rotatable member whose axis bears an angular relation to the axis of said fulcrum, means including a hinge portion and a pivot portion for connecting two of said vibration transmitting members, the axes of said hinge portion and said fulcrum being common and said pivot lying on the axis of said rotatable member.

12. A sound reproducing device comprising two substantially long rods, means supporting said rods for rotation about their longitudinal axes, means supporting one of said rods for vertical and horizontal movement, means adapted to rotatively vibrate one end of one of said rods in accordance with vibrations of sound frequencies, sound producing means associated with one end of the other rod, and a flexible connector for connecting the other ends of said rods together.

In witness whereof, I hereunto subscribe my name this 31st day of January A. D., 1927.

HENRY C. HARRISON.